Aug. 9, 1932.  B. F. VOGT  1,870,661
PRINTER'S ROLLER AND PROCESS OF MAKING THE SAME
Filed Feb. 21, 1930  2 Sheets-Sheet 1
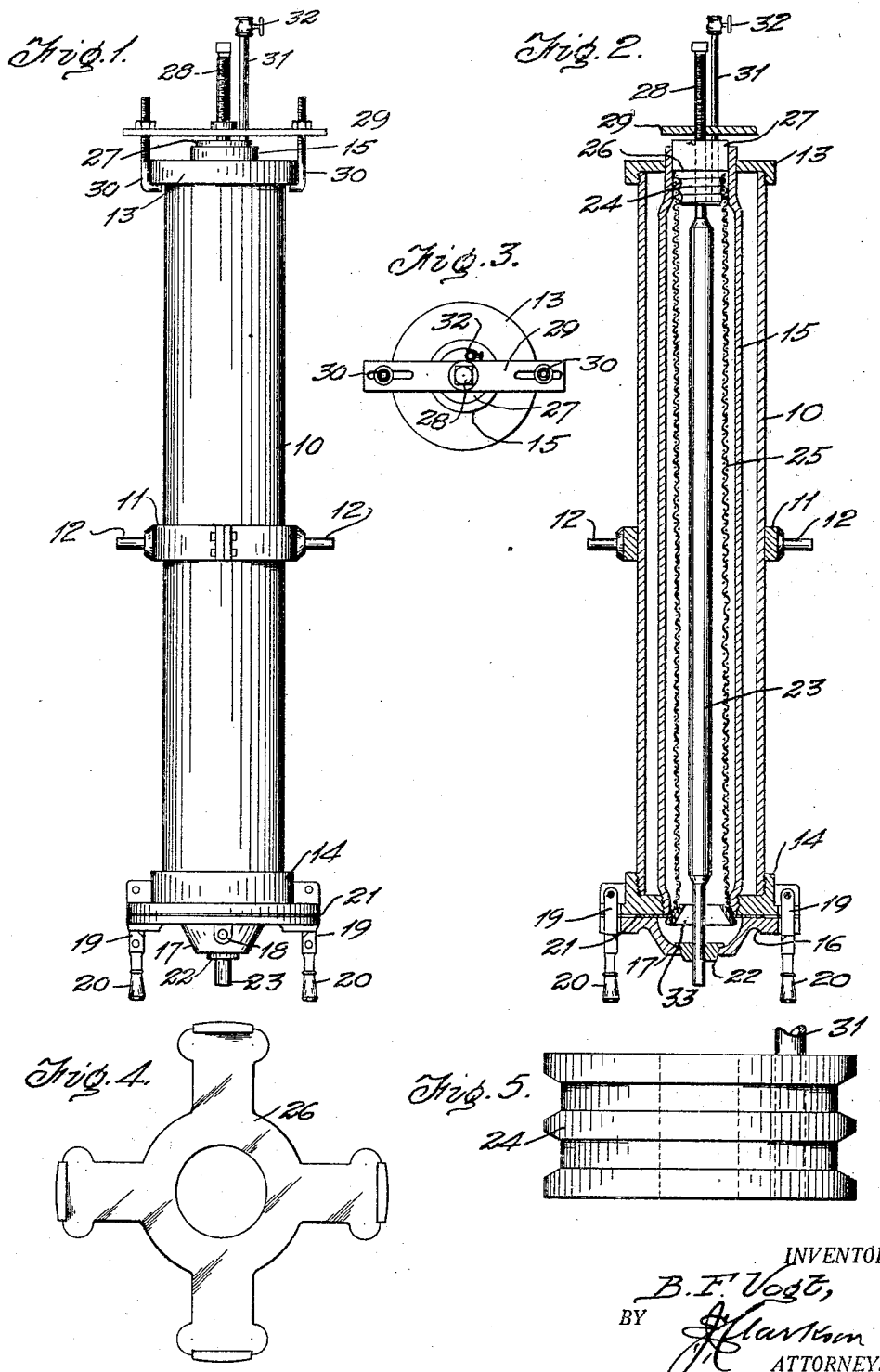
INVENTOR.
B. F. Vogt,
BY
ATTORNEYS.

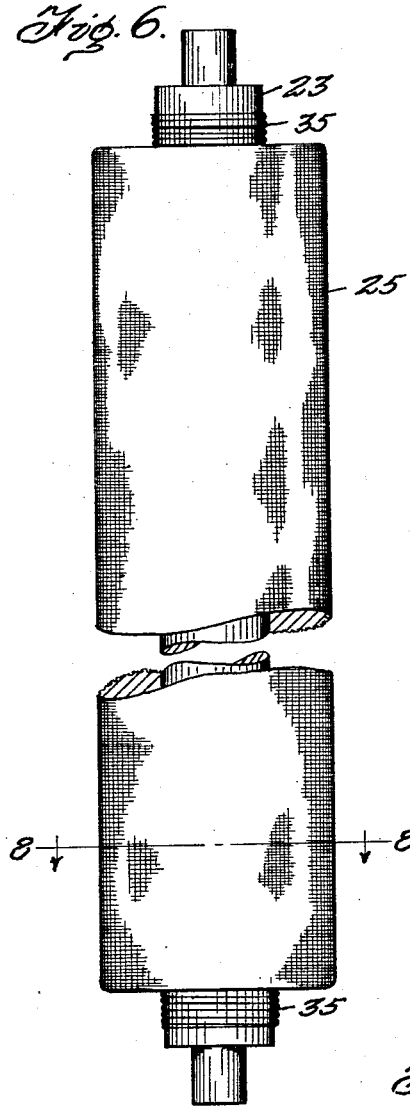
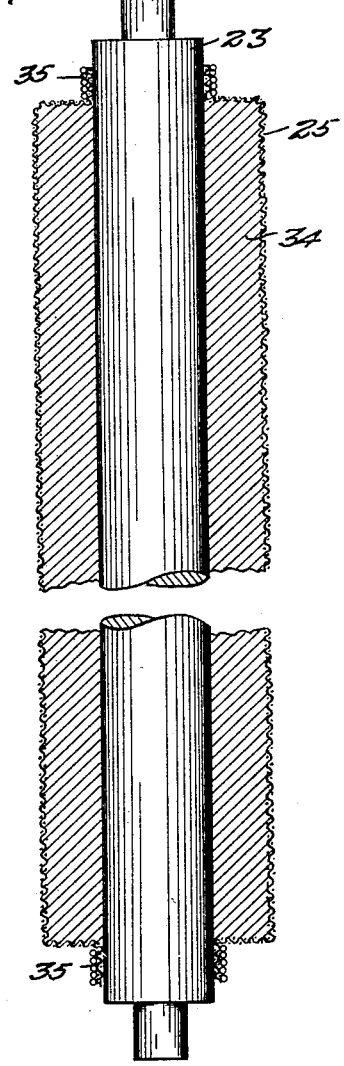
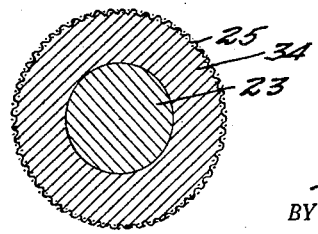

Patented Aug. 9, 1932

1,870,661

UNITED STATES PATENT OFFICE

BENEDICT F. VOGT, OF LOUISVILLE, KENTUCKY

PRINTER'S ROLLER AND PROCESS OF MAKING THE SAME

Application filed February 21, 1930. Serial No. 430,381.

This invention relates to printers' rollers and has special reference to an improved printer's roller and process for making the same.

The inking and distributing rollers, usually called printers' rollers, which form part of the mechanism come in practically all printing presses, ordinarily consist of a steel core or stock on which is molded the roller proper which receives and distributes the ink. The material of which this roller is molded is well known in its usual form and consists of a composition of glue and glycerine sometimes having other ingredients therein. This material is of elastic quality which is essential in doing good work on a printing press. However, the material also is somewhat absorbent and it is necessary to frequently wash off the rollers to prevent the ink being absorbed and the roller getting a hard inelastic surface which will not properly distribute the ink. Furthermore, this composition softens in the summer-time and tends to run when the composition is of the proper stiffness for use in the colder months. Other rollers of this type have been made with solid rubber and a steel core but these solid rubber rollers lack the elasticity of the composition rollers and swell under use so that it is necessary, after several months' use, to grind the rubber roller down.

There has been shown and described in my copending application for patent Ser. No. 293,417 filed July 17, 1928, a printer's roller and method of making the same which overcomes the objections above noted. However, for certain purposes it is preferable to use a printer's roller having a fabric surface. Heretofore such rollers have been found defective in operation because the fabric covering in rollers manufactured by the usual methods tends to become slack and wrinkle, thus interfering with the proper and even distribution of ink. Also, because of the employment of a composition in such rollers which softens when used under ordinary summer heat the rollers previously made became deformed and cannot effect proper and even ink distribution.

One important object of the present invention is to provide a novel construction of printer's roller having a fabric coating or surface.

A second important object of the invention is to provide an improved form of fabric covered printer's roller wherein the fabric covering is in the form of a seamless tube and is so expanded and stretched that it cannot wrinkle in use.

A third important object of the invention is to provide a novel form of fabric covered roller wherein the body of the roller is formed of a compound which will not soften in use under summer temperatures so that the fabric covering will retain its cylindrical shape without being subject to deformity.

A fourth important object of the invention is to provide an improved method of manufacturing such a roller.

It is further to be noted that the usual manner of manufacturing rollers is to inject the material into the mold by pressure but no provision is made for substantially closing the end of the mold so that as the material rises in the mold and fills the same pressure can be exerted and maintained, if desired, until material has fully set. In the present invention a pressure plate is provided inside of the mold at the top of the roller stock, so that when the composition comes into contact with this pressure plate the plate resists further upward movement of the composition of the roll and pressure is obtained, thereby packing the material into the mold and around the roller stock as tightly as may be found desirable, this same pressure forcing the air out of the composition that would otherwise be entrained therein. This, of course, makes the composition more compact and eliminates shrinking of the roller.

Moreover, to hold this roller in perfect condition there is used a composition which is not meltable in the ordinary temperatures of use and which climatic conditions will not affect. If other ordinary meltable composition were used under the same conditions by forcing the composition into a canvas cover, this meltable composition would, under the summer heat and conditions of use become soft and would shrink and the fabric covering would corrugate and become untrue.

A fifth important object of the invention is to provide an improved method of manufacture of a printer's roller having a fabric cover wherein the composition, forming the body of the roll is of a character which does not melt under conditions of use and is not affected by climatic changes, the composition being forcibly pressed into the fabric cover.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and Figure 1 is a side elevation of an improved mold especially adapted for the production of the roller described herein.

Figure 2 is a vertical diametric section through such a mold.

Figure 3 is an enlarged detail top plan view of the mold.

Figure 4 is an enlarged plan view of a centering star or spider used in the bottom of the mold.

Figure 5 is an enlarged plan view of a fabric clamping pressure head used in the top of the mold.

Figure 6 is a side elevation, partly broken away, of a roller constructed in accordance with this invention.

Figure 7 is a longitudinal median section through Figure 6.

Figure 8 is a section on the line 8—8 of Figure 6.

In the form of the mold which is especially adapted for this purpose there is provided a cylindrical body 10 centrally of which is positioned a ring 11 bearing trunnions 12 so that the body may be mounted on a suitable stand for handling. Screwed on the upper end of the body is a cap 13 and on the lower end is an annular cap plate 14 similarly screwed fast to the body 10. Screwed into the plate 14 and projecting through the plate 13 is a roller sizing tube 15. Fitted against the bottom ring 14 is a head 16 which has a centrally disposed hollow boss like portion 17 wherewith communicates a pipe attachment 18 through which plastic composition may be forced under pressure into the hollow head 16 so that it may rise in the tube 15. The head 16 is held on the ring 14 by swinging clamp members 19 provided with cam handles 20, the members 19 being pivoted to the ring 14 in such manner that the handles can swing beneath the ring 16, and, being rotated, can force the head 16 toward the ring 14 so as to clamp the packing washer 21 and prevent escape of the compound. The head 34 is further provided with a central opening having a bushing 22 therein wherein fits the reduced end of the stock or core 23 of the roller. At the upper end this stock or core passes through a circumferentially grooved tube clamping pressure head 24 which is so arranged that the fabric tube 25 forming the covering of the roller is clamped between this head and the sizing tube 15. Also the upper reduced end of the stock 23 passes through a centering star or spider 26 to accurately center the stock in the tube 15. On top of this centering star is a pressure plate 27 which is forced down and held in position by a clamping screw 28 which passes through a cross bar 29 having hook bolts 30 at its ends which engage beneath the cap 13. An air vent 31 having a valve 32 is provided at the upper end of the mold, the vent pipe passing through the members 24, 26 and 27 so that air may be allowed to escape, during the filling operation, from between the fabric tube 25 and the stock 23. The lower end of the tube 25 is held in position and kept from slipping upwardly by a tapered clamping ring 33 which fits in that lower end and forces the fabric tube tightly against the lower end of the tube 15 which is slightly bevelled for that purpose.

In the operation of the mold, after the parts are assembled as shown in Figure 2 with the fabric covering somewhat slack or flacid between the ends, the plastic material 34 is introduced from the bottom through the pipe connection 18 and flows up within the fabric tube. The valve 32 is left open until all air is driven out and is then closed and pressure applied to the composition entering through the pipe connection so that the fabric is expanded and stretched to fit the tube 15. The composition is allowed to set and the parts disassembled. When taken out the fabric will project beyond the composition 34 and will be crimped down and bound on the stock by cord or wire 35 thus preventing any working out of the composition at the roller ends.

There has thus been provided an improved and highly efficient roller and process for manufacturing the same as well as a mold therefor.

It is obvious that minor changes may be made both in the form of the roller and in the process employed and the mold without affecting the material principles involved and it is not, therefore, desired to confine the invention to the exact roller or process herein set forth but it is wished to include all such as properly come within the scope claimed.

Having thus described the invention what is claimed as new is:

1. Those steps in the process of constructing a printer's roller which consist in assembling a circumferentially expansible tubular fabric casing in unexpanded condition on a stock with its ends held in fixed spaced relation, placing the casing and stock in a mold having a diameter equal to the finished article and greater than the diameter of the unexpanded tubular casing, and forcing a cushioning compound in a freely plastic state into said casing whereby to expand and stretch the casing circumferentially while maintaining it at a fixed length, and allowing the compound to solidify with the casing thus stretched whereby the compound will be under radial compression upon removal of the mold.

2. Those steps in the process of constructing a printer's roller which consist in assembling a circumferentially expansible tubular fabric casing in unexpanded condition on a stock with its ends held in fixed spaced relation, placing the casing and stock in a mold having a diameter equal to the finished article and greater than the diameter of the unexpanded tubular casing, and forcing a cushioning compound in a freely plastic state into said casing whereby to expand and stretch the casing circumferentially while maintaining it at a fixed length, allowing the compound to solidify with the casing thus stretched whereby the compound will be under radial compression upon removal of the mold, and crimping the ends of the casing against the stock and there securing them.

In testimony whereof I affix my signature.

BENEDICT F. VOGT.